United States Patent [19]

Farr

[11] 4,320,622

[45] Mar. 23, 1982

[54] PUMP UNLOADER AND ACCUMULATOR CHARGING VALVE

[75] Inventor: Glyn P. R. Farr, Leek Wootton, England

[73] Assignee: Lucas Industries Limited, Birmingham, England

[21] Appl. No.: 63,085

[22] Filed: Aug. 2, 1979

[30] Foreign Application Priority Data

Aug. 17, 1978 [GB] United Kingdom ............... 33637/78

[51] Int. Cl.[3] .............................................. F16D 31/02

[52] U.S. Cl. ...................................... 60/418; 137/101; 137/118

[58] Field of Search .................. 137/101, 118; 60/418; 417/298

[56] References Cited

U.S. PATENT DOCUMENTS 2,799,995 7/1957 Herman ................................ 60/418
3,915,186 10/1975 Thomas ............................ 60/418 X
4,060,340 11/1977 Yanik et al. ..................... 417/298 X
4,173,866 11/1979 Farr ...................................... 60/418

*Primary Examiner*—William R. Cline
*Attorney, Agent, or Firm*—Scrivener, Clarke, Scrivener and Johnson

[57] ABSTRACT

In an hydraulic system an unloader valve is located in a line between a pump and an hydraulic accumulator. The unloader valve is operative to prevent the accumulator from being overcharged and to allow the pump to re-charge the accumulator should the pressure stored therein fall below a desired minimum value. The unloader valve incorporates a control valve comprising a spool and a pressure responsive slave which is operated by fluid pressure under the control of the control valve. A single spring acts to bias the spool into a first position against pressure in a control chamber into which fluid is pumped through a first one-way inlet valve. A second one-way exhaust valve located between the first one-way valve and an exhaust port can be opened by the slave to unload the pump.

8 Claims, 6 Drawing Figures

PUMP UNLOADER AND ACCUMULATOR CHARGING VALVE

This invention relates to improvements in hydraulic systems of the kind in which an hydraulic accumulator is charged with hydraulic fluid under pressure by means of an hydraulic pump which draws hydraulic fluid from a tank, and an unloader valve disposed in a supply line between the pump and the accumulator is operative to prevent the accumulator from being overcharged and to allow the pump to re-charge the accumulator should the pressure stored therein fall below a desired minimum value. Our invention is particularly concerned with improvements in unloader valves for hydraulic systems of the kind set forth.

In an hydraulic system of the kind set forth the unloader valve provides the accumulator with a working range in which the pump can idle, or be disabled, to prevent the hydraulic fluid from overheating. Ideally, when the accumulator pressure is at a maximum, the pump should be inoperative so that there will be no circulation of fluid and this would mean zero pump torque when idling. Such an ideal is not always practical and it usually means that the pump circulates fluid at zero pressure.

Where used herein the term "hydraulic accumulator" is intended to include any pressure chamber in which hydraulic fluid is stored at high pressure. For example, such a pressure chamber may comprise the pressure chamber of an hydraulic suspension strut.

Known unloader valves incorporate in parallel a cut-out valve, suitably a first control piston which is loaded by a first spring, and a diverter valve, suitably a second control piston which is loaded by a second spring, with both valves subjected to pressure in the accumulator, in which the cut-out valve determines a "cut-out" point at which it closes to prevent the accumulator from being overcharged when a force generated by accumulator pressure exceeds the force in the first spring and, after the cut-out valve closes, the diverter valve moves in opposition to the second spring into a diverting position in which pump pressure is diverted, suitably to the tank, until the pressure in the accumulator has dropped to a value at a "cut-in" point at which the second spring moves the diverter valve into a position to re-apply pump pressure to the accumulator until the cut-out point is again reached. Once unloaded the fluid from the pump must still circulate back to the tank and this places an unnecessary amount of work on the fluid, especially if the pump is driven by the prime mover of a vehicle, and the vehicle is suitable for high speed cruising for example on motorways.

According to our invention in an hydraulic system of the kind set forth the unloader valve incorporates a control valve, and a pressure responsive slave which is operated by fluid pressure under the control of the control valve, the control valve comprising a valve member which is movable between a first position in which the accumulator is isolated from the slave so that pump pressure is supplied to the accumulator, and a second position in which fluid pressure from the accumulator or the pump can act on the slave to render the slave operative to unload the pump, and a single spring for biassing the valve member towards the first position, the valve member having a constant area subjected to a control pressure dependent upon the pressure in the accumulator or the pump and in response to which the valve member can move at a cut-out point from the first position into the second position against the bias in the single spring, the bias in the single spring alone determining a cut-in point at an accumulator pressure less than the pressure in the accumulator at a cut-out point at which the valve member can move from the second position into the first position.

Preferably the control valve and the slave are arranged co-axially and work in a single bore.

The construction is therefore relatively simple and compact and the working parts can be arranged co-axially to provide efficient operation of the unloader valve.

Preferably a restriction is located in the connection between the control valve and the slave so that the signal to unload or reduce the pump pressure to atmosphere at the cut-out point is given prior to a decrease in pump pressure, due to time lag before the pressure necessary to operate the slave can be built-up. Similarly the restrictor provides a delay between the cut-in point to re-charge the accumulator and the point at which the slave is operative to permit the pump to re-charge the accumulator.

Preferably, the single spring acts to bias the valve member into the first position against the control pressure which is present in a control chamber into which fluid is pumped through a first one-way valve, and a second one-way valve is connected between the inlet of the first one-way valve and an exhaust port connected to the tank, the second one-way valve being opened by the slave at the cut-out point so that the pump output is returned directly to the tank.

At the cut-out point the pump simply drives fluid into, and draws fluid from, the tank at low pressure.

The pump may be separate from the unloader valve, being connected to it through an external connection. Alternatively the pump and the unloader valve may be combined in a common housing. In such a construction the first and second one-way valves may also serve as the exhaust and inlet valves respectively for the pump. This has the advantage of reducing the cost and also further reduces the work done on the fluid in the period between the cut-out and cut-in points, because the pump is disabled when the second one-way valve is opened by the slave, with the result that the fluid is no longer circulated. Instead a small volume of fluid is alternatively drawn into, and expelled from, the pumping chamber through a very short passage incorporating only the second one-way valve.

Conveniently the valve member comprises a valve spool which works in a bore in the housing and is acted upon at one end by the spring, and the valve spool includes axially spaced lands which control communication between the pump, the slave, and the accumulator.

BRIEF DESCRIPTION OF THE DRAWINGS

Two embodiments of our invention are illustrated in the accompanying drawings in which.

Figure 1:
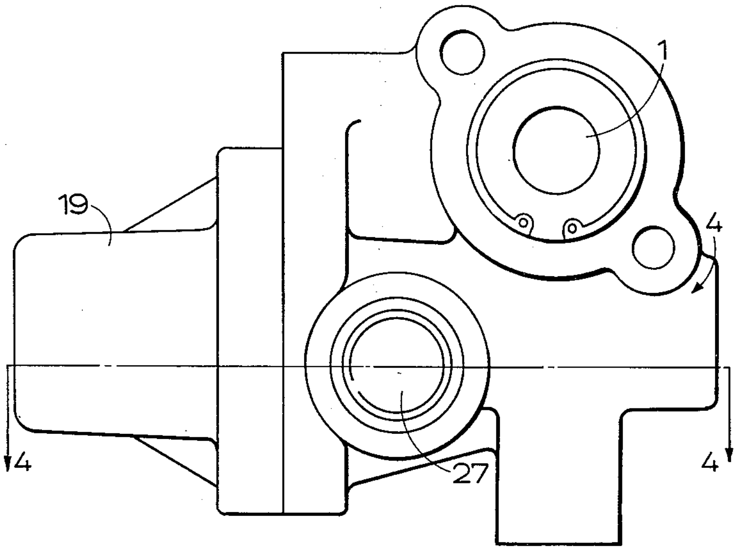
FIG. 1 is a side elevation of a combined unloader valve and pump assembly.
Figure 2:
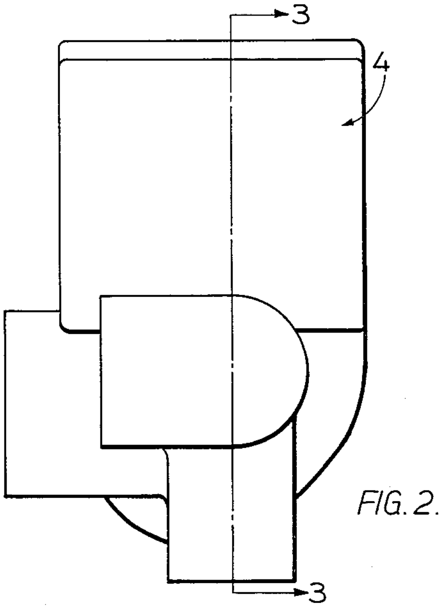
FIG. 2 is an end elevation of the same.
Figure 3:
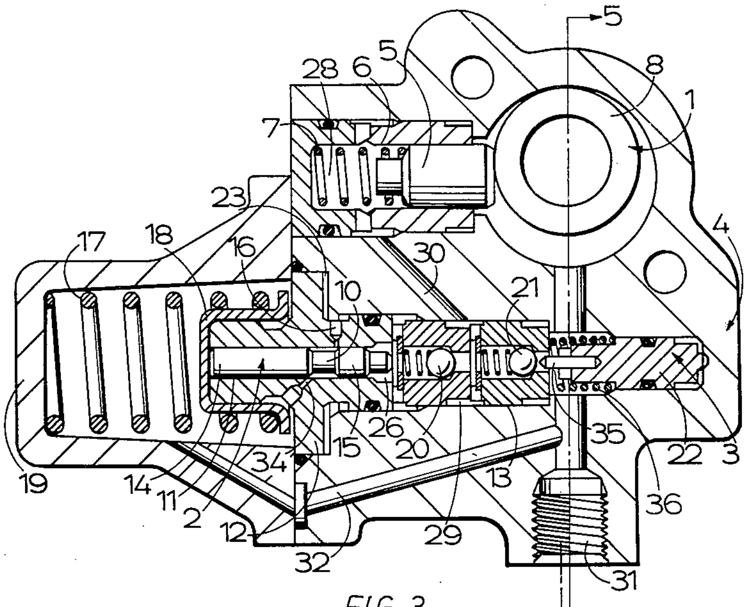
FIG. 3 is a section on the line 3—3 of FIG. 2.
Figure 4:
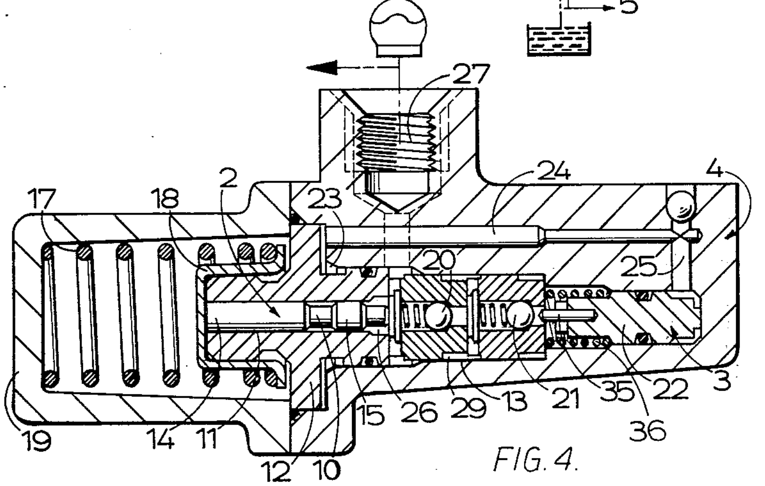
FIG. 4 is a section on the line 4—4 of FIG. 1.
Figure 5:
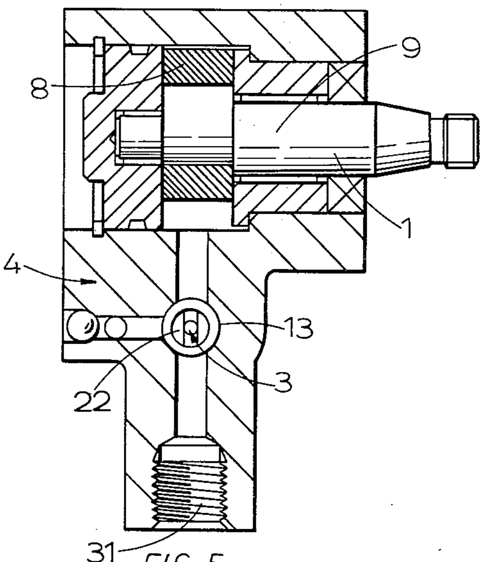
FIG. 5 is a section on the line 5—5 of FIG. 3.

In the combined unloader valve and pump assembly illustrated in FIGS. 1 to 5 of the accompanying drawings a pump 1, a control valve 2, and a pressure responsive slave 3 are incorporated within a common housing 4.

The pump 1 comprises a plunger 5 which is reciprocated in a bore 6 in the housing 4 against the loading in a spring 7 by means of an eccentric cam 8 which is mounted on a transverse shaft 9, conveniently driven by the prime mover of the vehicle.

The control valve 2 comprises a spool 10 working in a bore 11 in a closure member 12 for the open end of a blind bore 13 in the housing 4 and which is parallel to the bore 6. The spool 10 comprises a first land 14 of substantial length which terminates at the outer end of the spool, and a second land 15 which is spaced from the first. The second land 15 is disposed on the inner side of a restricted orifice 16 in the wall of the closure member 12 when the spool 10 is urged into a first position substantially in alignment with the outer end of the closure member 12 by means of a single spring 17. The inner end of the spring 17 acts on the spool 10 through an abutment 18 of top-hat outline and at its outer end abuts against a sealed end cap 19.

The bore 13 is of stepped outline. A portion of the bore 13 which is of greater area accommodates a pair of spring-loaded one-way valves 20 and 21 which are arranged in series and open and close in corresponding directions, and the pressure responsive slave 3 comprises a piston 22 which works in the inner end portion of the bore 13 which is of smaller area, and is returned by a spring 36 to a stop in the housing 4.

A chamber 23 defined between the closure member 12 and the wall of the bore 13 and into which the orifice 16 issues, is connected through longitudinal and transverse passages 24 and 25 into the end of the bore 13 adjacent to its closed end so that the piston 22 at that end is exposed to pressure in the chamber 23.

A control chamber 26 defined between the one-way valve 20 and the closure member 12 is adapted to be connected to an accumulator from an outlet port 27, and the inner end of the spool 10 is subjected to pressure in that chamber 26.

A pump chamber 28 at the end of the bore 6 which is remote from the cam 8 is connected to a space 29 between the two one-way valves 20 and 21 through a passage 30, the valve 21 constituting a suction valve.

Finally, an exhaust port 31 for connection to a tank for hydraulic fluid traverses the bore 13 between the piston 22 and the one-way valve 21, and is connected to the interior of the end cap 19 through an internal passage 32.

In a normal inoperative and depressurised position as shown in the drawings, both one-way valves 20 and 21 are closed and the spool 10 is in its first position with the land 15 isolating the control chamber 26 from the orifice 16. In this position the chamber 23 is connected to the interior of the end cap 19 through a passage 34 in the end closure 12 so that the chamber 23 is at atmospheric tank pressure.

When the pump is operated the suction stroke of the piston 5, under the effect of the loading in the spring 7, draws fluid from the tank and into the bore 6 through the one-way valve 21, the chamber 29, and the passage 30 with the one-way valve 20 remaining closed. The delivery stroke of the piston 5 by the cam 8 pumps fluid back through the passage 30, through the valve 20 and into the accumulator through the control chamber 26.

The pressure in the accumulator increases until the equal pressure in the control chamber, acting on the inner end of the spool 10, is sufficient at a cut-out point, say 1000 p.s.i., to move the spool 10 axially against the loading in the spring 17. This movement closes the orifice 34 to isolate the chamber 23 from tank.

As the pressure in the accumulator continues to rise, the spool 10 moves further in the same direction against the loading in the spring 17 until a pressure, say 1350 p.s.i. is attained, which is predetermined by the rate and the initial load of the spring 17. At this point the land 15 clears the orifice 16 so that the closed end of the bore 13 becomes connected to the chamber 26 through the orifice 16. The piston 22 is thus subjected to the pressure in the accumulator, which advances it in the bore 13, and a probe 35 at the forward end of the piston 22 is operative to open the one-way valve 21. This unloads the pump and, thereafter, the pump simply draws fluid from, and returns, fluid to, the tank, loaded only by its return spring 7.

Because of the effect of the orifice 16 on the speed of travel of the slave piston 22, the pump may produce several delivery strokes before the piston can open the valve 21.

As the pressure to the accumulator is reduced during power service, the spool 10 will be moved progressively towards the one-way valves 20 and 21 by the spring 17 and, after a small movement, the land 15 will close the orifice 16 to isolate the control chamber 26 from the closed end of the bore 13. Fluid is then trapped in the chamber 23 and the passage 24 to prevent the piston 22 from returning to its original position until a cut-in pressure is reached when the spool 10 will have returned to its original position in which the chamber 23 is again connected to tank through the space between the two lands 14 and 15, and the passage 34. The piston 22 is then driven back to its original position by the spring 36 and the valve 21 closes.

Figure 6:
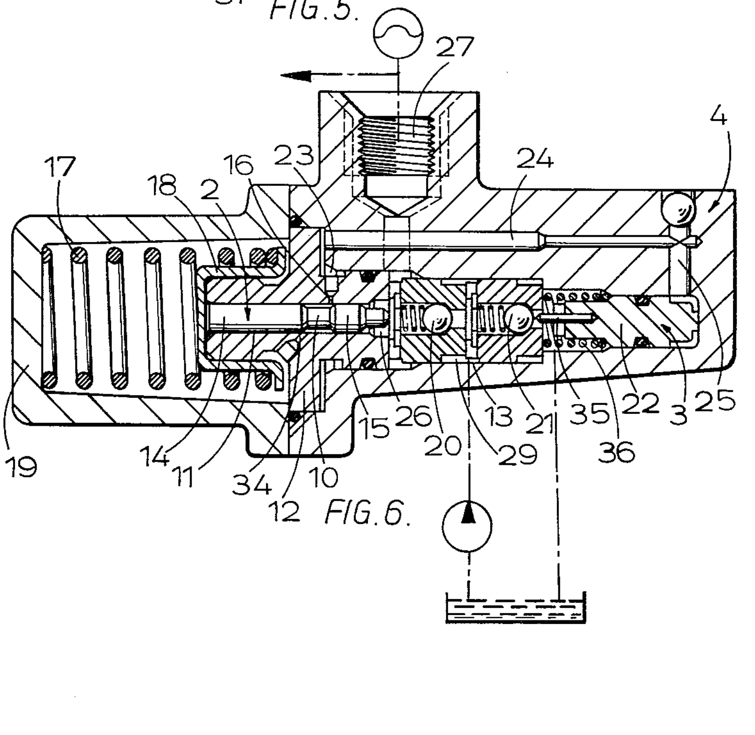
FIG. 6 is a view similar to FIG. 4 of an unloader valve for use with a separate pump.

In the embodiment of FIG. 6 the integral pump is omitted, and a separate pump is connected through an external connection into the annular pump space 29 in the bore 13 between the two one-way valves 20 and 21.

The construction and operation of the unloader valve illustrated in FIG. 6 is otherwise the same as that incorporated in the assembly of FIGS. 1 to 5, and corresponding reference numerals have been applied to corresponding parts.

I claim:

1. An hydraulic system comprising a tank for hydraulic fluid, an hydraulic accumulator, a pump for drawing fluid from said tank to charge said accumulator, and an unloader valve comprising a body having a first port connected to said pump, a second port connected to said accumulator and a third port connected to said tank, a control valve member in said body having a region of constant area subjected to the pressure at said first or second ports, a suction valve in said body biased at all times towards its closed position for controlling a connection in said body between said first and third ports, a pressure responsive slave member in said body for operating against said suction valve to retain same open to unoad said pump, first fluid passage means extending between said control valve member and said slave member, second fluid passage means extending between said control valve member and atmosphere, said control valve member being movable between a first position in which said first fluid passage means is disconnected from said second port and connected to said second fluid passage means and a second position in which said first fluid passage means is disconnected from said second fluid passage means and connected with said second port, and a single spring biassing said control valve member towards its first position but yielding at a first predetermined pressure at said first or second ports to move from said first to said second position, said bias in said single spring being selected that said control valve member responds to a second predetermined pressure at said second port less than the first to move from its second to its first position.

2. An hydraulic system as claimed in claim 1, wherein said control valve member and said slave member are arranged co-axially and work in a single bore in said body.

3. An hydraulic system as claimed in claim 1 wherein a restriction is located in the first fluid passage between said control valve member and said slave member.

4. An hydraulic system as claimed in claim 1 including a control chamber in said body and a first one-way valve through which fluid is pumped through said first port into said control chamber to provide a control pressure, said single spring acting to bias said control valve member into said first position against said control pressure, and said suction valve comprises a second one-way valve connected between the inlet side of said first one-way valve and said third port, said second one-way valve being opened by said slave member at said first predetermined pressure so that said pump communicates directly with said tank through said third port.

5. An hydraulic system as claimed in claim 1, in which said pump is combined with said unloader valve in said body.

6. An hydraulic system as claimed in claim 1, wherein said pump is separate from said body and an external connection connects said pump to said first port in said body.

7. An hydraulic system as claimed in claim 1, wherein said control valve member comprises a valve spool, and said body incorporates a bore in which said valve spool works, said spring acting upon one end of said spool, and said spool including axially spaced lands which control communication between said first and second ports and said first and second fluid passage means.

8. The system of claim 7 wherein said bore includes a first slave port connected to said first fluid passage means a second atmospheric pressure port connected to said second fluid passage means, and said valve spool includes a land which maintains said first slave port closed as the valve member is moved between its first and second positions, said land being constructed and arranged to connect said first slave port either to the second atmospheric port or to control pressure depending on whether said control valve member is in its first or second positions, respectively, whereby said slave member is subjected to pressure and said pump retained unloaded as said control pressure decreases from its first to its second predetermined level and said land moves past said first port to maintain the same closed until said control valve member has moved to its first position.

* * * * *